United States Patent
Credelle et al.

(10) Patent No.: US 7,283,142 B2
(45) Date of Patent: Oct. 16, 2007

(54) COLOR DISPLAY HAVING HORIZONTAL SUB-PIXEL ARRANGEMENTS AND LAYOUTS

(75) Inventors: Thomas Lloyd Credelle, Morgan Hill, CA (US); Candice Hellen Brown Elliott, Vallejo, CA (US); Moon Hwan Im, Santa Rosa, CA (US)

(73) Assignee: Clairvoyante, Inc., Sebastopol, CA (US)

( * ) Notice: Subject to any disclaimer, the term of this patent is extended or adjusted under 35 U.S.C. 154(b) by 339 days.

(21) Appl. No.: 10/278,393

(22) Filed: Oct. 22, 2002

(65) Prior Publication Data

US 2003/0090581 A1 May 15, 2003

Related U.S. Application Data

(63) Continuation-in-part of application No. 09/628,122, filed on Jul. 28, 2000, and a continuation-in-part of application No. 10/150,394, filed on May 17, 2002, and a continuation-in-part of application No. 10/024,326, filed on Dec. 14, 2001, now Pat. No. 6,950,115, and a continuation-in-part of application No. 09/916,232, filed on Jul. 25, 2001, now Pat. No. 6,903,754.

(51) Int. Cl.
G09G 5/02 (2006.01)
G09G 3/28 (2006.01)
G09G 3/32 (2006.01)
G09G 3/36 (2006.01)

(52) U.S. Cl. .................. 345/694; 345/690; 345/597; 345/598; 345/589; 345/695; 345/72; 345/83; 345/88

(58) Field of Classification Search ............... 345/589, 345/690–695, 597–598, 72, 83, 88, 649
See application file for complete search history.

(56) References Cited

U.S. PATENT DOCUMENTS 3,971,065 A 7/1976 Bayer (Continued)

FOREIGN PATENT DOCUMENTS

DE 197 46 329 A1 3/1999

(Continued)

OTHER PUBLICATIONS

Brown Elliott, C, "Co-Optimization of Color AMLCD Subpixel Architecture and Rendering Algorithms," SID 2002 Proceedings Paper, May 30, 2002 pp. 172-175.

(Continued)

Primary Examiner—Jin-Cheng Wang

(57) ABSTRACT

A color display having horizontal sub-pixel arrangements and layouts is disclosed. The display can include a plurality of a sub-pixel group. The sub-pixel group can have a plurality of sub-pixels wherein each sub-pixel has a height along a vertical axis and a width along a horizontal axis. The width of each sub-pixel is greater in length than its height in the sub-pixel group. The display also includes a column driver coupled to each sub-pixel in a column and a row driver coupled to each sub-pixel in a row of the sub-pixel group. Each sub-pixel in the sub-pixel group is coupled to the row driver along the width of the sub-pixel.

23 Claims, 8 Drawing Sheets

U.S. PATENT DOCUMENTS

| | | |
|---|---|---|
| 4,353,062 A | 10/1982 | Lorteije et al. |
| 4,593,978 A | 6/1986 | Mourey et al. |
| 4,642,619 A | 2/1987 | Togashi |
| 4,651,148 A | 3/1987 | Takeda et al. |
| 4,751,535 A | 6/1988 | Myers |
| 4,773,737 A | 9/1988 | Yokono et al. |
| 4,781,438 A | 11/1988 | Noguchi |
| 4,786,964 A | 11/1988 | Plummer et al. |
| 4,792,728 A | 12/1988 | Chang et al. |
| 4,800,375 A | 1/1989 | Silverstein et al. |
| 4,822,142 A | 4/1989 | Yasui |
| 4,853,592 A | 8/1989 | Strathman |
| 4,874,986 A | 10/1989 | Menn et al. |
| 4,886,343 A | 12/1989 | Johnson |
| 4,908,609 A | 3/1990 | Stroomer |
| 4,920,409 A | 4/1990 | Yamagishi |
| 4,965,565 A | 10/1990 | Noguchi |
| 4,966,441 A | 10/1990 | Conner |
| 4,967,264 A | 10/1990 | Parulski et al. |
| 4,989,079 A | 1/1991 | Ito |
| 5,006,840 A | 4/1991 | Hamada et al. |
| 5,052,785 A | 10/1991 | Takimoto et al. |
| 5,113,274 A | 5/1992 | Takahashi et al. |
| 5,132,674 A | 7/1992 | Bottorf |
| 5,144,288 A | 9/1992 | Hamada et al. |
| 5,184,114 A | 2/1993 | Brown |
| 5,189,404 A | 2/1993 | Masimo et al. |
| 5,233,385 A | 8/1993 | Sampsell |
| 5,311,205 A | 5/1994 | Hamada et al. |
| 5,311,337 A | 5/1994 | McCartney, Jr. |
| 5,315,418 A | 5/1994 | Sprague et al. |
| 5,334,996 A | 8/1994 | Tanigaki et al. |
| 5,341,153 A | 8/1994 | Benzschawel et al. |
| 5,398,066 A | 3/1995 | Martinez-Uriegas et al. |
| 5,436,747 A | 7/1995 | Suzuki |
| 5,461,503 A | 10/1995 | Deffontaines et al. |
| 5,485,293 A | 1/1996 | Robinder |
| 5,535,028 A | 7/1996 | Bae et al. |
| 5,541,653 A | 7/1996 | Peters et al. |
| 5,561,460 A | 10/1996 | Katoh et al. |
| 5,563,621 A | 10/1996 | Silsby |
| 5,579,027 A | 11/1996 | Sakurai et al. |
| 5,642,176 A | 6/1997 | Abukawa et al. |
| 5,646,702 A | 7/1997 | Akinwande et al. |
| 5,648,793 A | 7/1997 | Chen |
| 5,661,371 A | 8/1997 | Salerno et al. |
| 5,729,244 A | 3/1998 | Lockwood |
| 5,754,163 A | 5/1998 | Kwon |
| 5,754,226 A | 5/1998 | Yamada et al. |
| 5,773,927 A | 6/1998 | Zimlich |
| 5,792,579 A | 8/1998 | Phillips |
| 5,808,594 A | 9/1998 | Tsubyama et al. |
| 5,815,101 A | 9/1998 | Fonte |
| 5,821,913 A | 10/1998 | Mamiya |
| 5,856,050 A | 1/1999 | Inoue et al. |
| 5,899,550 A | 5/1999 | Masaki |
| 5,917,556 A | 6/1999 | Katayama |
| 5,949,496 A | 9/1999 | Kim |
| 5,973,664 A | 10/1999 | Badger |
| 6,002,446 A | 12/1999 | Eglit |
| 6,005,692 A | 12/1999 | Stahl |
| 6,008,868 A | 12/1999 | Silverbrook |
| 6,034,666 A | 3/2000 | Kanai et al. |
| 6,037,719 A | 3/2000 | Yap et al. |
| 6,038,031 A | 3/2000 | Murphy |
| 6,049,626 A | 4/2000 | Kim |
| 6,061,533 A | 5/2000 | Kajiwara |
| 6,064,363 A | 5/2000 | Kwon |
| 6,072,272 A | 6/2000 | Rumbaugh |
| 6,097,367 A | 8/2000 | Kuriwaki et al. |
| 6,108,122 A | 8/2000 | Ulrich et al. |
| 6,144,352 A * | 11/2000 | Matsuda et al. .............. 345/83 |
| 6,147,664 A | 11/2000 | Hansen |
| 6,151,001 A | 11/2000 | Anderson et al. |
| 6,160,535 A | 12/2000 | Park |
| 6,184,903 B1 | 2/2001 | Omori |
| 6,188,385 B1 | 2/2001 | Hill et al. |
| 6,198,507 B1 | 3/2001 | Ishigami |
| 6,219,025 B1 | 4/2001 | Hill et al. |
| 6,225,967 B1 | 5/2001 | Hebiguchi |
| 6,225,973 B1 | 5/2001 | Hill et al. |
| 6,236,390 B1 | 5/2001 | Hitchcock |
| 6,239,783 B1 | 5/2001 | Hill et al. |
| 6,243,055 B1 | 6/2001 | Fergason |
| 6,243,070 B1 | 6/2001 | Hill et al. |
| 6,262,710 B1 | 7/2001 | Smith |
| 6,271,891 B1 | 8/2001 | Ogawa et al. |
| 6,278,434 B1 | 8/2001 | Hill et al. |
| 6,299,329 B1 | 10/2001 | Mui et al. |
| 6,326,981 B1 | 12/2001 | Mori et al. |
| 6,327,008 B1 | 12/2001 | Fujiyoshi |
| 6,340,998 B1 | 1/2002 | Kim et al. |
| 6,346,972 B1 | 2/2002 | Kim |
| 6,360,023 B1 | 3/2002 | Betrisey et al. |
| 6,377,262 B1 | 4/2002 | Hitchcock et al. |
| 6,392,717 B1 | 5/2002 | Kunzman |
| 6,393,145 B2 | 5/2002 | Betrisey et al. |
| 6,396,505 B1 | 5/2002 | Lui et al. |
| 6,441,867 B1 | 8/2002 | Daly |
| 6,453,067 B1 | 9/2002 | Morgan et al. |
| 6,459,419 B1 | 10/2002 | Matsubayashi |
| 6,466,618 B1 | 10/2002 | Messing et al. |
| 6,469,756 B1 | 10/2002 | Booth, Jr. |
| 6,469,766 B2 | 10/2002 | Waterman et al. |
| 6,486,923 B1 * | 11/2002 | Maeshima et al. .......... 348/649 |
| 6,509,904 B1 | 1/2003 | Lam |
| 6,552,706 B1 | 4/2003 | Ikeda et al. |
| 6,624,828 B1 | 9/2003 | Dresevic et al. |
| 6,628,068 B1 | 9/2003 | Rorison et al. |
| 6,661,429 B1 * | 12/2003 | Phan .......................... 345/694 |
| 6,674,430 B1 | 1/2004 | Kaufman et al. |
| 6,674,436 B1 | 1/2004 | Dresevic et al. |
| 6,680,761 B1 * | 1/2004 | Greene et al. ................ 349/73 |
| 6,681,053 B1 | 1/2004 | Zhu |
| 6,714,206 B1 | 3/2004 | Martin et al. |
| 6,714,212 B1 | 3/2004 | Tsuboyama et al. |
| 6,738,526 B1 | 5/2004 | Betrisey et al. |
| 6,750,875 B1 | 6/2004 | Keely, Jr. et al. |
| 6,771,028 B1 | 8/2004 | Winters |
| 6,801,220 B2 | 10/2004 | Greier et al. |
| 6,804,407 B2 | 10/2004 | Weldy |
| 6,833,888 B2 | 12/2004 | Song et al. |
| 6,833,890 B2 | 12/2004 | Hong et al. |
| 6,836,300 B2 | 12/2004 | Choo et al. |
| 6,850,294 B2 | 2/2005 | Roh et al. |
| 6,856,704 B1 | 2/2005 | Gallagher et al. |
| 6,867,549 B2 | 3/2005 | Cok et al. |
| 6,885,380 B1 | 4/2005 | Primerano et al. |
| 6,888,604 B2 | 5/2005 | Rho et al. |
| 6,897,876 B2 | 5/2005 | Murdoch et al. |
| 6,903,378 B2 | 6/2005 | Cok |
| 6,903,754 B2 | 6/2005 | Brown Elliott |
| 6,927,754 B2 | 8/2005 | Lai |
| 6,930,676 B2 | 8/2005 | De Haan et al. |
| 6,989,876 B2 | 1/2006 | Song et al. |
| 7,042,537 B2 | 5/2006 | Kanazawa et al. |
| 7,110,012 B2 | 9/2006 | Messing et al. |
| 2001/0017515 A1 | 8/2001 | Kusunoki et al. |
| 2001/0017607 A1 | 8/2001 | Kwon et al. |
| 2001/0040645 A1 | 11/2001 | Yamazaki |
| 2002/0012071 A1 | 1/2002 | Sun |
| 2002/0015110 A1 | 2/2002 | Brown Elliott |
| 2002/0017645 A1 | 2/2002 | Yamazaki |
| 2002/0093476 A1 | 7/2002 | Hill et al. |

| | | |
|---|---|---|
| 2002/0122160 A1 | 9/2002 | Kunzman |
| 2002/0140831 A1 | 10/2002 | Hayashi |
| 2002/0158997 A1 | 10/2002 | Fukami et al. |
| 2002/0180688 A1 | 12/2002 | Drzaic et al. |
| 2002/0186229 A1 | 12/2002 | Brown Elliott |
| 2002/0190648 A1 | 12/2002 | Bechtel et al. |
| 2002/0191130 A1 | 12/2002 | Liang et al. |
| 2003/0011613 A1 | 1/2003 | Booth, Jr. |
| 2003/0034992 A1 | 2/2003 | Brown Elliott et al. |
| 2003/0043567 A1 | 3/2003 | Hoelen |
| 2003/0063054 A1 | 4/2003 | Inukai |
| 2003/0071826 A1 | 4/2003 | Goertzen |
| 2003/0071943 A1 | 4/2003 | Choo et al. |
| 2003/0077000 A1 | 4/2003 | Blinn et al. |
| 2003/0085906 A1 | 5/2003 | Elliott et al. |
| 2003/0103058 A1 | 6/2003 | Elliott et al. |
| 2003/0117423 A1 | 6/2003 | Brown Elliott |
| 2003/0128179 A1 | 7/2003 | Credelle et al. |
| 2003/0128225 A1 | 7/2003 | Credelle et al. |
| 2003/0218618 A1 | 11/2003 | Phan |
| 2004/0008208 A1 | 1/2004 | Dresevic et al. |
| 2004/0021804 A1 | 2/2004 | Hong et al. |
| 2004/0061710 A1 | 4/2004 | Messing et al. |
| 2004/0075764 A1 | 4/2004 | Law et al. |
| 2004/0095521 A1 | 5/2004 | Song et al. |
| 2004/0114046 A1 | 6/2004 | Lee et al. |
| 2004/0150651 A1 | 8/2004 | Phan |
| 2004/0155895 A1 | 8/2004 | Lai |
| 2004/0169807 A1 | 9/2004 | Rho et al. |
| 2004/0174389 A1 | 9/2004 | Ben-David et al. |
| 2004/0179160 A1 | 9/2004 | Rhee et al. |
| 2004/0189662 A1 | 9/2004 | Frisken et al. |
| 2004/0189664 A1 | 9/2004 | Frisken et al. |
| 2004/0223005 A1 | 11/2004 | Lee |
| 2004/0239813 A1 | 12/2004 | Klompenhouwer |
| 2004/0239837 A1 | 12/2004 | Hong et al. |
| 2005/0007539 A1 | 1/2005 | Taguchi et al. |
| 2005/0024380 A1 | 2/2005 | Lin et al. |
| 2005/0040760 A1 | 2/2005 | Taguchi et al. |
| 2005/0068477 A1 | 3/2005 | Shin et al. |
| 2005/0083356 A1 | 4/2005 | Roh et al. |
| 2005/0140634 A1 | 6/2005 | Takatori |
| 2005/0151752 A1 | 7/2005 | Phan |
| 2005/0157264 A1 | 7/2005 | Chen et al. |
| 2005/0168423 A1 | 8/2005 | Hirata et al. |
| 2005/0169551 A1 | 8/2005 | Messing et al. |
| 2005/0253994 A1 | 11/2005 | Kamijima et al. |
| 2005/0254127 A1 | 11/2005 | Evans et al. |

FOREIGN PATENT DOCUMENTS

| | | |
|---|---|---|
| DE | 299 09 537 U1 | 10/1999 |
| DE | 199 23 527 | 11/2000 |
| DE | 199 23 527 A1 | 11/2000 |
| DE | 201 09 354 U1 | 9/2001 |
| EP | 0 158 366 A2 | 10/1985 |
| EP | 0 203 005 A1 | 11/1986 |
| EP | 0 322 106 A2 | 6/1989 |
| EP | 0 0671 650 | 9/1995 |
| EP | 0 793 214 A1 | 9/1997 |
| EP | 0 812 114 A1 | 12/1997 |
| EP | 0 878 969 | 11/1998 |
| EP | 0 899 604 A2 | 3/1999 |
| EP | 899 604 A2 | 3/1999 |
| EP | 1 083 539 A2 | 3/2001 |
| EP | 1 261 014 A2 | 11/2002 |
| GB | 2 133 912 A | 8/1984 |
| GB | 2 146 478 A | 4/1985 |
| JP | 60-107022 | 6/1985 |
| JP | 02-000826 A | 1/1990 |
| JP | 03-78390 | 4/1991 |
| JP | 03-036239 B | 5/1991 |
| JP | 06-102503 | 4/1994 |
| JP | 06-214250 | 8/1994 |
| JP | 02-983027 B2 | 11/1999 |
| JP | 2001203919 | 7/2001 |
| JP | 2004-004822 | 1/2004 |
| WO | WO 97/23860 | 7/1997 |
| WO | WO 00/21067 | 4/2000 |
| WO | WO 00/42564 | 7/2000 |
| WO | WO 00/42762 | 7/2000 |
| WO | WO 00/45365 | 8/2000 |
| WO | WO 00/67196 | 11/2000 |
| WO | WO 00/70392 | 11/2000 |
| WO | WO 01/10112 A2 | 2/2001 |
| WO | WO 01/29817 A1 | 4/2001 |
| WO | WO 01/52546 A2 | 7/2001 |
| WO | WO 02/11112 A2 | 2/2002 |
| WO | WO 02/059685 A2 | 8/2002 |
| WO | WO 03/014819 A1 | 2/2003 |
| WO | WO 2004/021323 A2 | 3/2004 |
| WO | WO 2004/027503 A1 | 4/2004 |
| WO | WO 2004/086128 A1 | 10/2004 |
| WO | WO 2005/050296 A1 | 6/2005 |

OTHER PUBLICATIONS

Brown Elliott, C, "Development of the PenTile Matrix™ Color AMLCD Subpixel Architecture and Rendering Algorithms", SID 2003, Journal Article.

Brown Elliott, C, "New Pixel Layout for PenTile Matrix™ Architecture", IDMC 2002, pp. 115-117.

Brown Elliott, C, "Pentile Matrix™ Displays and Drivers" ADEAC Proceedings Paper, Portland OR., Oct. 2005.

Brown Elliott, C, "Reducing Pixel Count Without Reducing Image Quality", Information Display Dec. 1999, vol. 1, pp. 22-25.

E-Reader Devices and Software, Jan. 1, 2001, Syllabus, http://www.campus-technology.com/article.asp?id=419.

Feigenblatt, Ron, "Remarks on Microsoft ClearType™", http://www.geocities.com/SiliconValley/Ridge/6664/ClearType.html, Dec. 5, 1998, Dec. 7, 1998, Dec. 12, 1999, Dec. 26, 1999, Dec. 30, 1999 and Jun. 19, 2000, 30 pages.

Messing, Dean et al., Improved Display Resolution of Subsampled Colour Images Using Subpixel Addressing, IEEE ICIP 2002, vol. 1, pp. 625-628.

Messing, Dean et al., Subpixel Rendering on Non-Striped Colour Matrix Displays, 2003 International Conf on Image Processing, Sep. 2003, Barcelona, Spain, 4 pages.

Poor, Alfred, "LCDs: The 800-pound Gorilla," Information Display, Sep. 2002, pp. 18-21.

Felici, James, "ClearType, CoolType: The Eyes Hve It," The Seybold Report on Internet Publishing, vol. 4, No. 8, Apr. 2000, available at http://www.syboldreports.com/SRIP/free/0408/cooltype.html.

Dipert, Brian, "Display technology's results are compelling, but legacy is un'clear'," EDN Magazine, Oct. 26, 2000, pp. 63-72.

"Getting Started with the Adobe Acrobat eBook Reader," Adobe Systems Incrorrated, 2001.

USPTO, Non-Final Office Action, dated Mar. 18, 2003 in U.S. Appl. No. 09/628,122.

Clairvoyante Inc., Response to Non-Final Office Action, dated Jul. 18, 2003 in U.S. Appl. No. 09/628,122.

USPTO, Final Office Action, dated Oct. 3, 2003 in U.S. Appl. No. 09/628,122.

Clairvoyante Inc., Response to Final Office Action, dated Jan. 16, 2004 in U.S. Appl. No. 09/628,122.

USPTO, Non-Final Office Action, dated Apr. 19, 2004 in U.S. Appl. No. 09/628,122.

Clairvoyante Inc., Response to Non-Final Office Action, dated Aug. 5, 2004 in U.S. Appl. No. 09/628,122.

USPTO, Non-Final Office Action, dated Jan. 11, 2005 in U.S. Appl. No. 09/628,122.

USPTO, Final Office Action, dated Jan. 28, 2005 in U.S. Appl. No. 09/628,122.

Clairvoyante Inc., Response to Final Office Action, dated Jan. 31, 2005 in U.S. Appl. No. 09/628,122.

USPTO, Non-Final Office Action, dated Feb. 10, 2006 in U.S. Appl. No. 09/628,122.
Clairvoyante Inc., Response to Non-Final Office Action, dated Jul. 1, 2006 in U.S. Appl. No. 09/628,122.
USPTO, Final Office Action, dated Sep. 20, 2006 in U.S. Appl. No. 09/628,122.
USPTO, Non-Final Office Action, dated Mar. 9, 2004 in US Patent No. 6,903,754 (U.S. Appl. No. 09/916,232).
USPTO, Non-Final Office Action, dated May 6, 2004 in US Patent No. 6,903,754 (U.S. Appl. No. 09/916,232).
Clairvoyante Inc., Response to Non-Final Office Action, dated Sep. 3, 2004 in US Patent No. 6,903,754 (U.S. Appl. No. 09/916,232).
USPTO, Final Office Action, dated Jan. 6, 2005 in US Patent No. 6,903,754 (U.S. Appl. No. 09/916,232).
Clairvoyante Inc., Response to Final Office Action, dated Jan. 28, 2005 in US Patent No. 6,903,754 (U.S. Appl. No. 09/916,232).
PCT International Search Report dated Aug. 21, 2002 for PCT/US02/14925 (U.S. Appl. No. 10/024,326).
PCT International Search Report dated Jul. 17, 2003 for PCT/US02/39859 (U.S. Appl. No. 10/278,393).
PCT International Search Report dated Jul. 30, 2003 for PCT/US02/39860 (U.S. Appl. No. 10/278,328).
PCT International Search Report dated Dec. 9, 2003 for PCT/US03/15283 (U.S. Appl. No. 10/150,394).
Clairvoyante Inc., Response to Final Office Action, dated Mar. 19, 2007 in U.S. Appl. No. 09/628,122.
USPTO, Notice of Allowance, dated Feb. 7, 2005 in US Patent No. 6,903,754 (U.S. Appl. No. 09/916,232).
Krantz, John H. et al., "Color Matrix Display Image Quality: The Effects of Luminance and Spatial Sampling," *SID International Symposium, Digest of Technical Paper*, 1990, pp. 29-32.
Messing, Dean S. et al., "Improved Display Resolution of Subsampled Colour Images Using Subpixel Addressing," *Proc. Int. Conf. Image Processing* (ICIP '02), Rochester, N.Y., IEEE Signal Process Society, 2002, vol. 1, pp. 625-628.
Messing, Dean S. et al., "Subpixel Rendering on Non-Striped Colour Matrix Displays," *International Conference on Image Processing*, Barcelona, Spain, Sep. 2003, 4 pages.
Lee, Baek-woon et al., "40.5L: Late-News Paper: TFT-LCD with RGBW Color System," SID 03 Digest, 2003, pp. 1212-1215.
"ClearType magnified," *Wired Magazine*, Nov. 8, 1999, Microsoft Typography, article posted Nov. 8, 1999, and last updated Jan. 27, 1999, © 1999 Microsoft Corporation, 1 page.
Credelle, Thomas L. et al., "P-00: MTF of High-Resolution PenTile Matrix™ Displays," *Eurodisplay 02 Digest*, 2002, pp. 1-4.
Daly, Scott, "Analysis of Subtriad Addressing Algorithms by Visual System Models," *SID Symp. Digest*, Jun. 2001, pp. 1200-1203.
Elliott, Candice H. Brown et al., "Color Subpixel Rendering Projectors and Flat Panel Displays," New Initiatives in Motion Imaging, SMPTE Advanced Motion Imaging Conference, Feb. 27-Mar. 1, 2003, Seattle, Washington, pp. 1-4.
Elliott, Candice H. Brown et al., "Co-optimization of Color AMLCD Subpixel Architecture and Rendering Algorithms," *SID Symp. Digest*, May 2002, pp. 172-175.
Feigenblatt, R.I., "Full-color imaging on amplitude-quantized color mosaic displays," *SPIE*, vol. 1075, Digital Image Processing Applications, 1989, pp. 199-204.
Johnston, Stuart J., "An Easy Read: Microsoft's ClearType," *InformationWeek Online*, Redmond, WA, Nov. 23, 1998, 3 pages.
Johnston, Stuart J., "Clarifying ClearType," *InformationWeek Online*, Redmond, WA, Jan. 4, 1999, 4 pages.
"Just Outta Beta," *Wired Magazine*, Dec. 1999, Issue 7.12, 3 pages
Klompenhouwer, Michiel A. et al., "Subpixel Image Scaling for Color Matrix Displays," *SID Symp. Digest*, May 2002, pp. 176-179.
Markoff, John, "Microsoft's Cleartype Sets Off Debate on Originality," *The New York Times*, Dec. 7, 1998, 5 pages.
"Microsoft ClearType," http://www.microsoft.com/opentype/cleartype, Sep. 26, 2002, 4 pages.
Platt, John C., "Optimal Filtering for Patterned Displays," Microsoft Research, *IEEE Signal Processing Letters*, 2000, 4 pages.
Platt, John, "Technical Overview of ClearType Filtering," Microsoft Research, http://research.microsoft.com/users/jplatt/cleartype/default.aspx, Sep. 17, 2002, 3 pages.
"Ron Feigenblatt's remarks on Microsoft ClearType™," http://www.geocities.com/SiliconValley/Ridge/6664/ClearType.html, Dec. 5, 1998, Dec. 7, 1998, Dec. 12, 1999, Dec. 26, 1999, Dec. 30, 1999, and Jun. 19, 2000, 30 pages.
"Sub-Pixel Font Rendering Technology," © 2003 Gibson Research Corporation, Laguna Hills, CA, 2 pages.
Werner, Ken, "OLEDs, OLEDs, Everywhere . . . ," *Information Display*, Sep. 2002, pp. 12-15.
Adobe Systems, Inc., website, 2002, http://www.adobe.com/products/acrobat/cooltype.html.
Betrisey, C., et al., "Displaced Filtering for Patterned Displays," 2000, *Society for Information Display (SID) 00 Digest*, pp. 296-299.
Carvajal, D., "Big Publishers Looking Into Digital Books," Apr. 3, 2000, *The New York Times*, Business/Financial Desk.
Elliott, C., "Active Matrix Display Layout Optimization for Subpixel Image Rendering," Sep. 2000, Proceedings of the 1st International Display Manufacturing Conference, pp. 185-189.
Elliott, C., "New Pixel Layout for PenTile Matrix," Jan. 2002, Proceedings of the International Display Manufacturing Conference, pp. 115-117.
Elliott, C., "Reducing Pixel Count without Reeducing Image Quality," Dec. 1999, *Information Display*, vol. 15, pp. 22-25.
Gibson Research Corporation, website, "Sub-Pixel Font Rendering Technology, How It Works," 2002, http://www.grc.com/ctwhat.html.
Martin, R., et al., "Detectability of Reduced Blue Pixel Count in Projection Displays," May 1993, *Society for Information Display (SID) 93 Digest*, pp. 606-609.
Microsoft Corporation, website, 2002, http://www.microsoft.com/reader/ppc/product/cleartype.html.
Microsoft Press Release, Nov. 15, 1998, Microsoft Research Announces Screen Display Breakthrough at COMDEX/Fall '98, PR Newswire.
Murch, M., "Visual Perception Basics," 1987, *SID*, Seminar 2, Tektronix, Inc., Beaverton, Oregon.
Okumura, H., et al., "A New Flicker-Reduction Drive Method for High-Resolution LCTVs," May 1991, *Society for Information Display (SID) International Symposium Digest of Technical Papers*, pp. 551-554.
Wandell, Brian A., Stanford University, "Fundamentals of Vision: Behavior, Neuroscience and Computation," Jun. 12, 1994, *Society for Information Display (SID) Short Course S-2*, Fairmont Hotel, San Jose, California.

\* cited by examiner

COLOR DISPLAY HAVING HORIZONTAL SUB-PIXEL ARRANGEMENTS AND LAYOUTS

RELATED APPLICATIONS

This application is a continuation-in-part of the following U.S. Patent Applications: U.S patent application Ser. No. 09/628,122 ("the '122 application"), entitled "ARRANGEMENT OF COLOR PIXELS FOR FULL COLOR IMAGING DEVICES WITH SIMPLIFIED ADDRESSING," filed on Jul. 28, 2000, ("the '754 patent") U.S. patent application Ser. No. 09/916,232 entitled "ARRANGEMENT OF COLOR PIXELS FOR FULL COLOR IMAGING DEVICES WITH SIMPLIFIED ADDRESSING," filed on Jul. 25, 2001 now U.S. Pat. No. 6,903,754, U.S. Patent Publication No. 2004/0046714 ("the '714 application") U.S. patent application Ser. No. 10/024,326, entitled "IMPROVEMENTS TO COLOR FLAT PANEL DISPLAY SUB-PIXEL ARRANGEMENTS AND LAYOUTS," filed on Dec. 14, 2001 now U.S. Pat. No. 6,950,115, and U.S. Patent Publication No. 2002/0186229 ("the '229 application") U.S. patent application Ser. No. 10/150,394 entitled "ROTATABLE DISPLAY WITH SUB-PIXEL RENDERING," filed on May 17, 2002, which are all hereby incorporated herein by reference.

This application is also related to the following co-pending U.S. Patent Applications: U.S. Patent Publication No. 2003/0128179 ("the '179 application") [U.S. patent application Ser. No. 10/278,352,] entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUB-PIXELS," filed on Oct. 22, 2002; U.S. Patent Publication No. 2003/0128225 ("the '225 application") [U.S. patent application Ser. No. 10/278,353,] entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed on Oct. 22, 2002; and U.S Patent Publication No. 2003/0117423 ("the '423 application") [U.S. patent application Ser. No. 10/278,328,] entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed on Oct. 22, 2002, which are all hereby incorporated herein by reference and commonly owned by the same assignee of this application.

BACKGROUND

The present application relates to improvements to display layouts, and, more particularly, to improved color pixel arrangements.

Full color perception is produced in the eye by three-color receptor nerve cell types called cones. The three types of cones are sensitive to different wavelengths of light: long, medium, and short ("red", "green", and "blue", respectively). The relative density of the three differs significantly from one another. There are slightly more red receptors than green receptors. There are very few blue receptors compared to red or green receptors.

The human vision system processes the information detected by the eye in several perceptual channels: luminance, chromanance, and motion. Motion is only important for flicker threshold to the imaging system designer. The luminance channel takes the input from only the red and green receptors. In other words, the luminance channel is "color blind." It processes the information in such a manner that the contrast of edges is enhanced. The chromanance channel does not have edge contrast enhancement. Since the luminance channel uses and enhances every red and green receptor, the resolution of the luminance channel is several times higher than the chromanance channels. Consequently, the blue receptor contribution to luminance perception is negligible. The luminance channel thus acts as a resolution band pass filter. Its peak response is at 35 cycles per degree (cycles/°). It limits the response at 0 cycles/° and at 50 cycles/° in the horizontal and vertical axis. This means that the luminance channel can only tell the relative brightness between two areas within the field of view. It cannot tell the absolute brightness. Further, if any detail is finer than 50 cycles/°, it simply blends together. The limit in the horizontal axis is slightly higher than the vertical axis. The limit in the diagonal axes is significantly lower.

The chromanance channel is further subdivided into two sub-channels, to allow us to see full color. These channels are quite different from the luminance channel, acting as low pass filters. One can always tell what color an object is, no matter how big it is in our field of view. The red/green chromanance sub-channel resolution limit is at 8 cycles/°, while the yellow/blue chromanance sub-channel resolution limit is at 4 cycles/°. Thus, the error introduced by lowering the red/green resolution or the yellow/blue resolution by one octave will be barely noticeable by the most perceptive viewer, if at all, as experiments at Xerox and NASA, Ames Research Center (see, e.g., R. Martin, J. Gille, J. Larimer, Detectability of Reduced Blue Pixel Count in Projection Displays, SID Digest 1993) have demonstrated.

The luminance channel determines image details by analyzing the spatial frequency Fourier transform components. From signal theory, any given signal can be represented as the summation of a series of sine waves of varying amplitude and frequency. The process of teasing out, mathematically, these sine-wave-components of a given signal is called a Fourier Transform. The human vision system responds to these sine-wave-components in the two-dimensional image signal.

Color perception is influenced by a process called "assimilation" or the Von Bezold color blending effect. This is what allows separate color pixels (also known as sub-pixels or emitters) of a display to be perceived as a mixed color. This blending effect happens over a given angular distance in the field of view. Because of the relatively scarce blue receptors, this blending happens over a greater angle for blue than for red or green. This distance is approximately 0.25° for blue, while for red or green it is approximately 0.12°. At a viewing distance of twelve inches, 0.25° subtends 50 mils (1,270μ) on a display. Thus, if the blue pixel pitch is less than half (625μ) of this blending pitch, the colors will blend without loss of picture quality. This blending effect is directly related to the chromanance sub-channel resolution limits described above. Below the resolution limit, one sees separate colors, above the resolution limit, one sees the combined color.

BRIEF DESCRIPTION OF THE DRAWINGS

The accompanying drawings, which are incorporated in, and constitute a part of this specification illustrate implementations and embodiments of the invention and, together with the description, serve to explain principles of the invention.

DETAILED DESCRIPTION

Reference will now be made in detail to implementations and embodiments of the invention, examples of which are illustrated in the accompanying drawings. Wherever possible, the same reference numbers will be used throughout the drawings to refer to the same or like parts.

Sub-Pixel Arrangements

Figure 1:
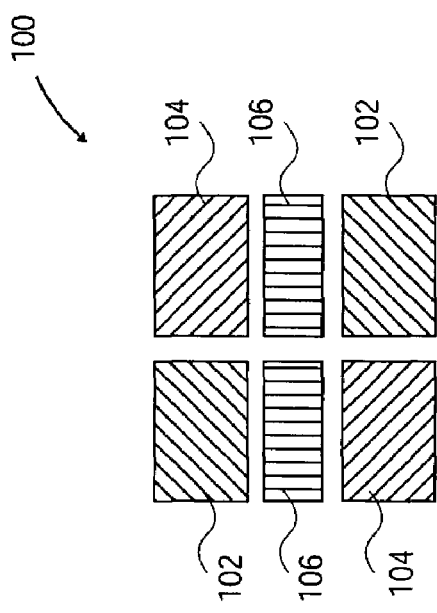
FIG. 1 shows a repeat cell of six sub-pixels wherein the sub-pixels are laid out length-wise horizontally.

In FIG. 1, an arrangement of sub-pixel emitters 100 is shown, comprising a six sub-pixel repeat cell comprised of three colors. This six sub-pixel repeat cell was substantial shown in the '232 application—however, the sub-pixels in FIG. 1 are laid out lengthwise along the horizontal axis. For example, the horizontal width of the sub-pixels can be greater in length than the vertical height of the sub-pixels. In one embodiment, sub-pixels 106 are blue colored, while sub-pixels 102 and 104 could be assigned either red or green colored, respectively. In another embodiment, sub-pixels 106 could be assigned the color green, while sub-pixels 102 and 104 are either red or blue colored, respectively. In yet another embodiment, sub-pixels 106 could be assigned the color red, while sub-pixels 102 and 104 are either green or blue colored, respectively. Other color variations can implemented as well, which are different from red, green and blue, such that the color gamut of the resulting arrangement creates a useable display from a user's standpoint.

As shown in FIG. 1, sub-pixels 102 and 104 are displayed in a "checkerboard" fashion whereby—the red and green sub-pixel subplanes are displayed 180 degrees out of phase. Such a checkerboard pattern has been previously disclosed in the '754 patent and in U.S. patent application Ser. No. 09/628,122("the '122 application"), entitled "ARRANGEMENT OF COLOR PIXELS FOR FULL COLOR IMAGING DEVICES WITH SIMPLIFIED ADDRESSING," filed on Jul. 28, 2000, which is hereby incorporated herein by reference and is commonly owned by the same assignee of this application—and such a checkerboard arrangement is similarly advantageous with the sub-pixels laid out in the horizontal axis as in the vertical axis.

As was disclosed in the '229 application, an entire panel constructed with the sub-pixels lengthwise in the vertical axis (e.g., the vertical height having a greater length that the horizontal width) could be enabled in software to perform sub-pixel rendering when the panel is physically rotated 90 degrees from the vertical—in essence, running the panel with all sub-pixels in the horizontal axis. This feature enabled a single panel to perform sub-pixel rendering while displaying images in either the landscape or portrait mode of operation.

It may be advantageous, however, to physically construct a panel with all sub-pixels laid out length-wise along the horizontal axis (e.g., the vertical height having a smaller length than the horizontal width). In particular, with sub-pixels 106 assigned with the color blue, one advantage is that the blue stripe is moved from the vertical to horizontal axis—thus, de-emphasizing the presence of a contiguous blue structure, which is more apparent to the human eye along the vertical axis than it is along the horizontal axis. A vertical blue stripe, thus, tends to interfere with text readability and uniformity as text is comprised mostly of vertical strokes. A similar advantage is also possible with sub-pixels 106 assigned the color green.

Figures 2A, 2B, 2C, 2D, 2E, 2F:
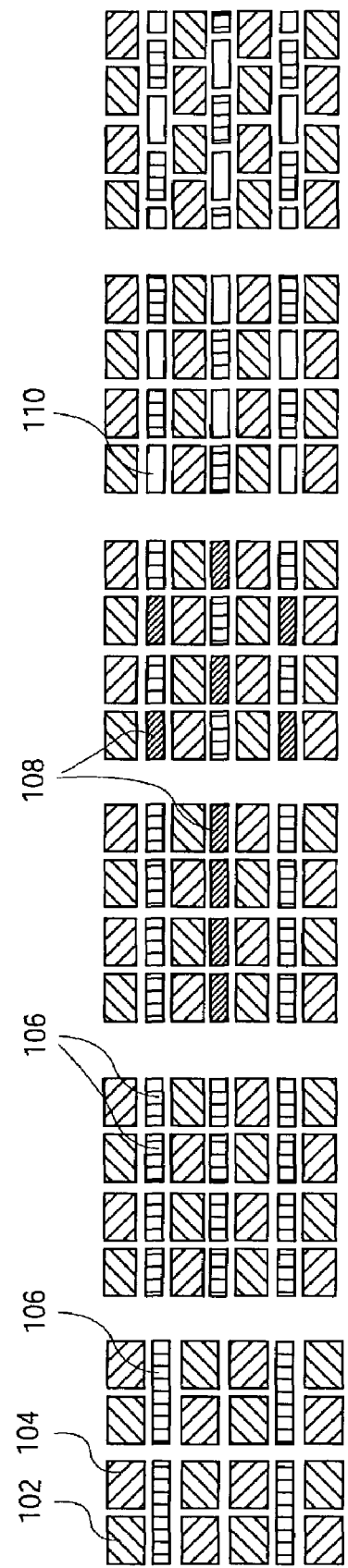
FIG. 2A through 2F depicts various embodiments of sub-pixel arrangements laid out in a horizontal fashion.

FIGS. 2A-2F depict several alternative embodiments of sub-pixel arrangements laid out in the horizontal axis. FIG. 2A show that the sub-pixels 106 are effectively twice the length along the horizontal axis of sub-pixels 102 and 104. Such a choice of length for sub-pixel 106 was previously disclosed in the '232 application along the vertical axis. Also shown, sub-pixels 106 could be of smaller width along the vertical axis than sub-pixels 102 and 104. Such a choice for length along the vertical axis is also disclosed in the related co-pending applications noted above.

FIGS. 2C and 2D depict the addition of a "black" pixel 108 that is disclosed in the co-pending and commonly assigned U.S. Patent Publication No. 2003/0117423 ("the '423 application") [U.S. patent application Ser. No. 10/278,328,] entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed on Oct. 22, 2002 Black pixel 108 could also be deployed in a staggered fashion, as shown in FIG. 2D. FIGS. 2E and 2F depict the addition of a fourth color pixel 110 as was previously disclosed in U.S. Patent Publication No. 2004/0051724 ("the '724 application") [U.S. patent application Ser. No. 10/243,094,] entitled "IMPROVED FOUR COLOR ARRANGEMENTS OF EMITTERS FOR SUB-PIXEL RENDERING," filed on Sep. 13, 2002, which is hereby incorporated herein by reference and commonly owned by the same assignee of this application.

Figure 3:
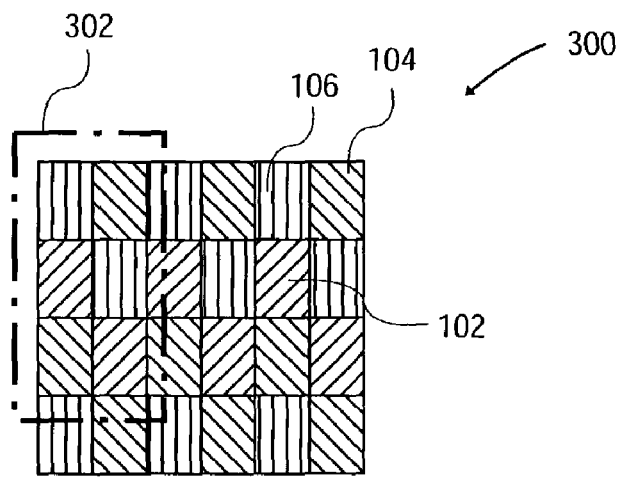
FIG. 3 shows a novel six sub-pixel repeat cell arrangement for a panel display.

FIG. 3 depicts an alternative arrangement 300 of sub-pixels comprising a 3 row×2 column repeat cell 302. One possible color assignment for arrangement 300 has sub-pixels 106 as blue, sub-pixels 102 as red, and sub-pixels 104 as green. This arrangement may be considered somewhat as placing the blue sub-pixel stripes on the horizontal axis, even though each sub-pixel has its lengthwise edge on the vertical axis. This arrangement further disperses the blue stripe by staggering the placement of blue sub-pixels; while slightly altering the red/green checkerboard pattern somewhat by placing the red and green subplanes partially 45 degrees out of phase thereby staggering the red and the green sub-pixels in a novel manner.

Circuit Architecture

Figure 4:
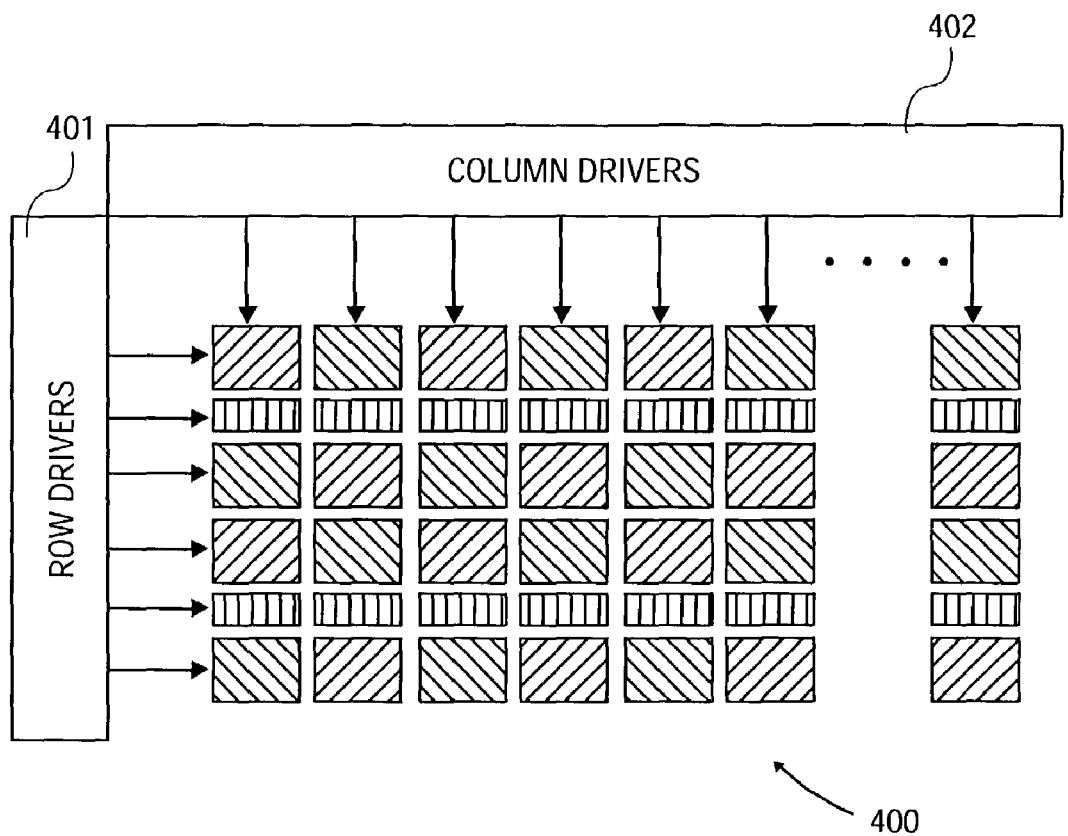
FIG. 4 shows one embodiment of an arrangement of sub-pixels laid out in a horizontal fashion connected to column and row drivers.

FIG. 4 depicts a high level architecture diagram whereby one exemplary sub-pixel arrangement 400 is laid out in the horizontal fashion described above and column drivers 402 and row drivers 404 are electrically mated to arrangement 400.

Figure 5:
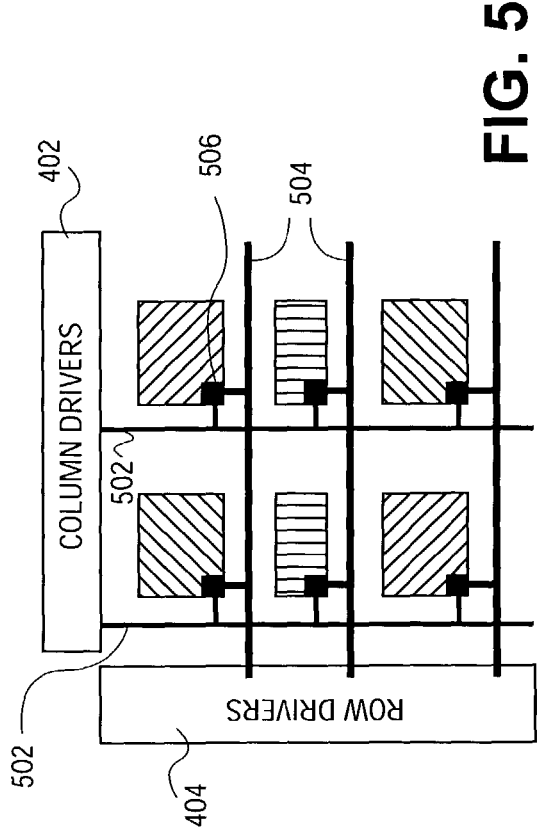
FIG. 5 shows one embodiment of a set of TFT connections to a sub-pixel arrangement.

For panels employing thin film transistors (TFTs) to actuate or drive sub-pixels, FIG. 5 depicts one embodiment of a TFT layout for the basic arrangement of FIG. 1. Each sub-pixel is connected to a column line 502 and a row line 504. TFT 506, located at each sub-pixel, actuates or drives a sub-pixel according to signals that are resident on its connected row and column line.

Figure 6B:
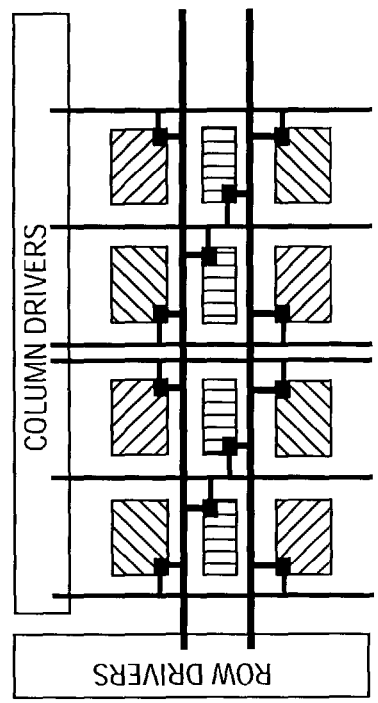
FIGS. 6A and 6B show two separate embodiments of an arrangement of sub-pixels comprising unique connections of its TFTs to the column drivers.
Figure 6A:
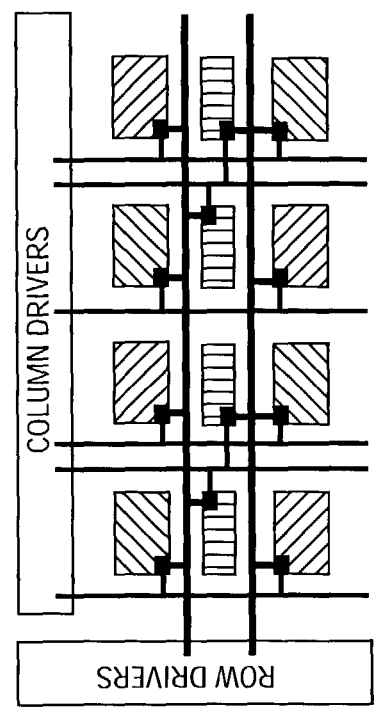

FIGS. 6A and 6B depict two alternative embodiments of TFT layouts 602 and 604 respectively. Each layout alters the location of the third column line differently from that of FIG. 5. In FIGS. 6A and 6B, the third column line is on the right or left of the second column of sub-pixels respectively. In FIG. 6A, there is a crossover of the third column line by the blue data going to the blue sub-pixel in the second row. In FIG. 6B, there are no data crossovers, which may minimize crosstalk. In either case, aperture ratio may decrease to allow for the extra column line.

Figure 7:
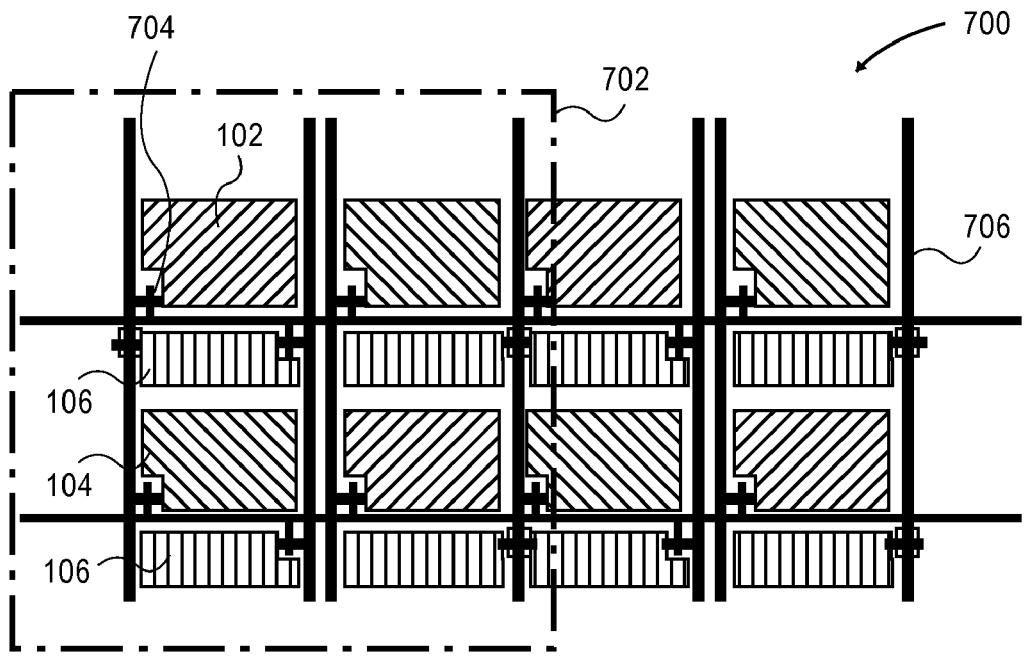
FIGS. 7 and 8 show two separate embodiments of a TFT connection for a novel eight sub-pixel repeat cell arrangement.
Figure 8:
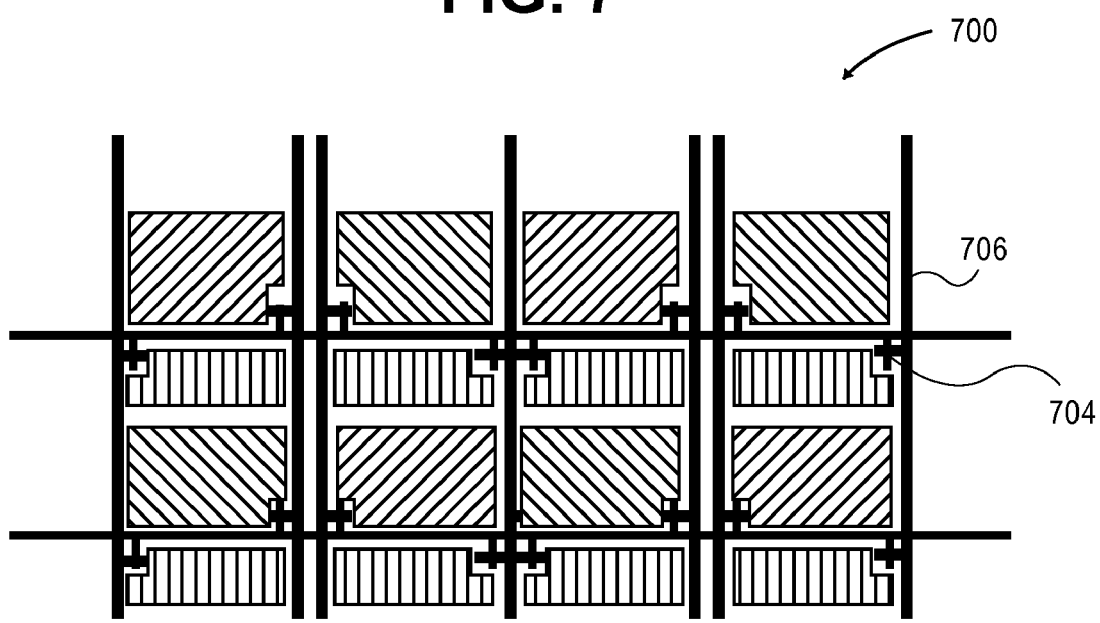

FIGS. 7 and 8 depict a layout for an arrangement 700 of sub-pixels comprising a repeat cell 702 of eight sub-pixels. This repeat cell—with its various color assignments for sub-pixels 102, 104 and 106—is further disclosed in the co-pending and commonly assigned '179 application and in the '225 application, both of which are referenced above. FIGS. 7 and 8 show this arrangement as laid out in a horizontal fashion. This octal grouping is unique in that it presents a second stripe of sub-pixels 106. The TFT layout for this arrangement may be constructed without adding TFTs (704), as shown in FIG. 7, or without adding extra drivers (706), as shown in FIG. 8.

With a color assignment of blue sub-pixels 106, red sub-pixels 102 and green sub-pixels 104, it can be seen in FIG. 7 that the blue data is sent to two blue sub-pixels through one TFT. There is a crossover of the red/green data line which may lead to some crosstalk. In FIG. 8, there are additional TFTs, but there are no crossovers.

Figure 9:
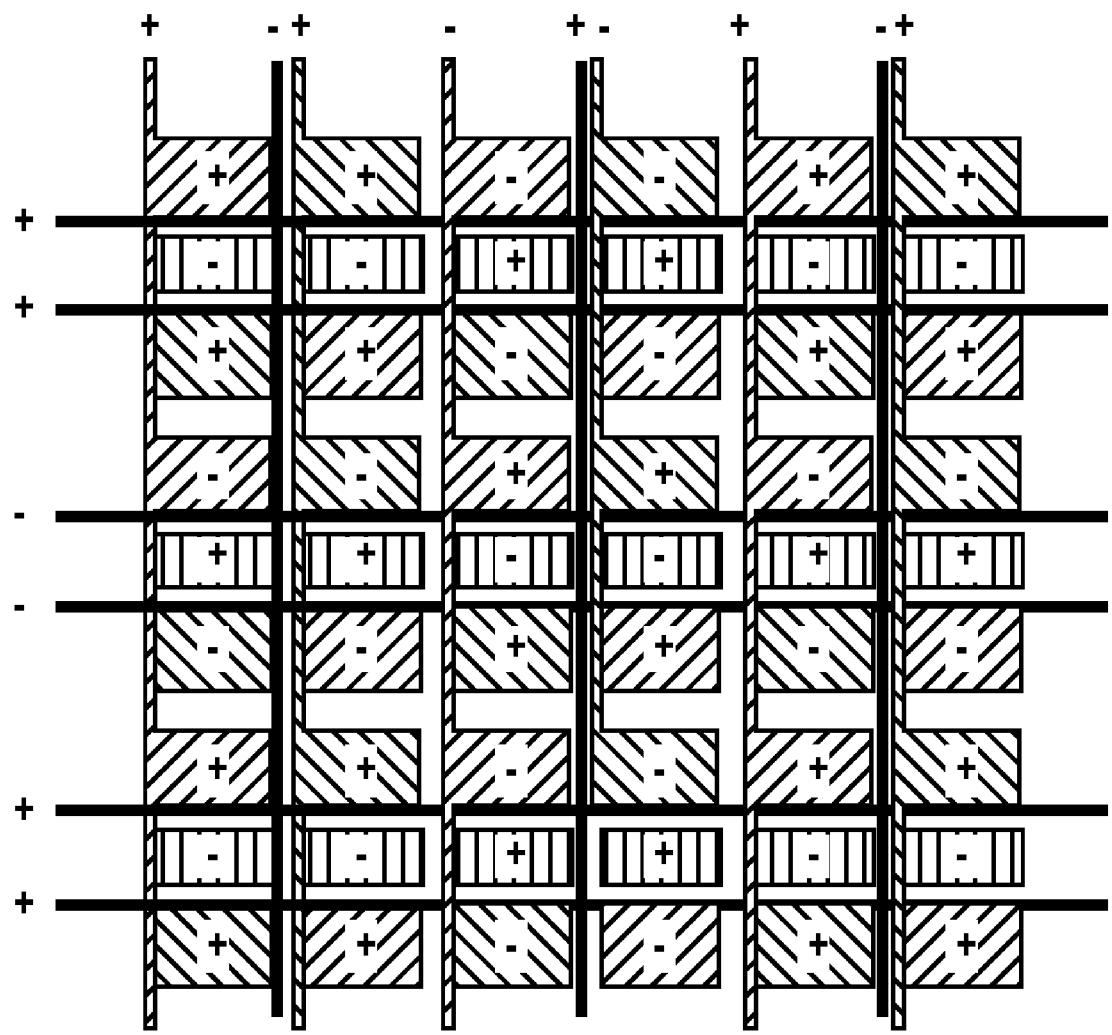
FIG. 9 shows one possible dot inversion scheme for one embodiment of an arrangement laid out in a horizontal fashion.

In the various arrangements above embodied in an AMLCD panel, a "dot inversion" scheme may be employed to operate the panel. Both a 1×1 and 2×1 dot inversion scheme have been previously discussed as suitable. In particular, a 2×1 dot inversion scheme may reduce crosstalk in some of these embodiments. In cases where there are two column lines adjacent, there may be two pixels that have the same polarity next to each other. However, the intervening data line is of opposite polarity, so low crosstalk may still be achieved. As one example, FIG. 9 depicts a dot inversion scheme for AMLCD panels having the arrangement of FIGS. 6A and 6B.

To achieve substantially the same number of drivers with a display utilizing octal repeat cell 702 of FIG. 7 as is achieved with a display utilizing 6-subpixel repeat cell 100 shown in FIG. 1, it is possible to interconnect the two blue rows 106. In a TFT array, this could be achieved with row or column metal lines. In a passive display, on the other hand, there is typically only the itanium tin oxide (ITO) line and no easy way to add a crossover. Therefore, the crossover is made in the column driver or on the TAB. This might add some cost and complexity to the display.

Figure 10:
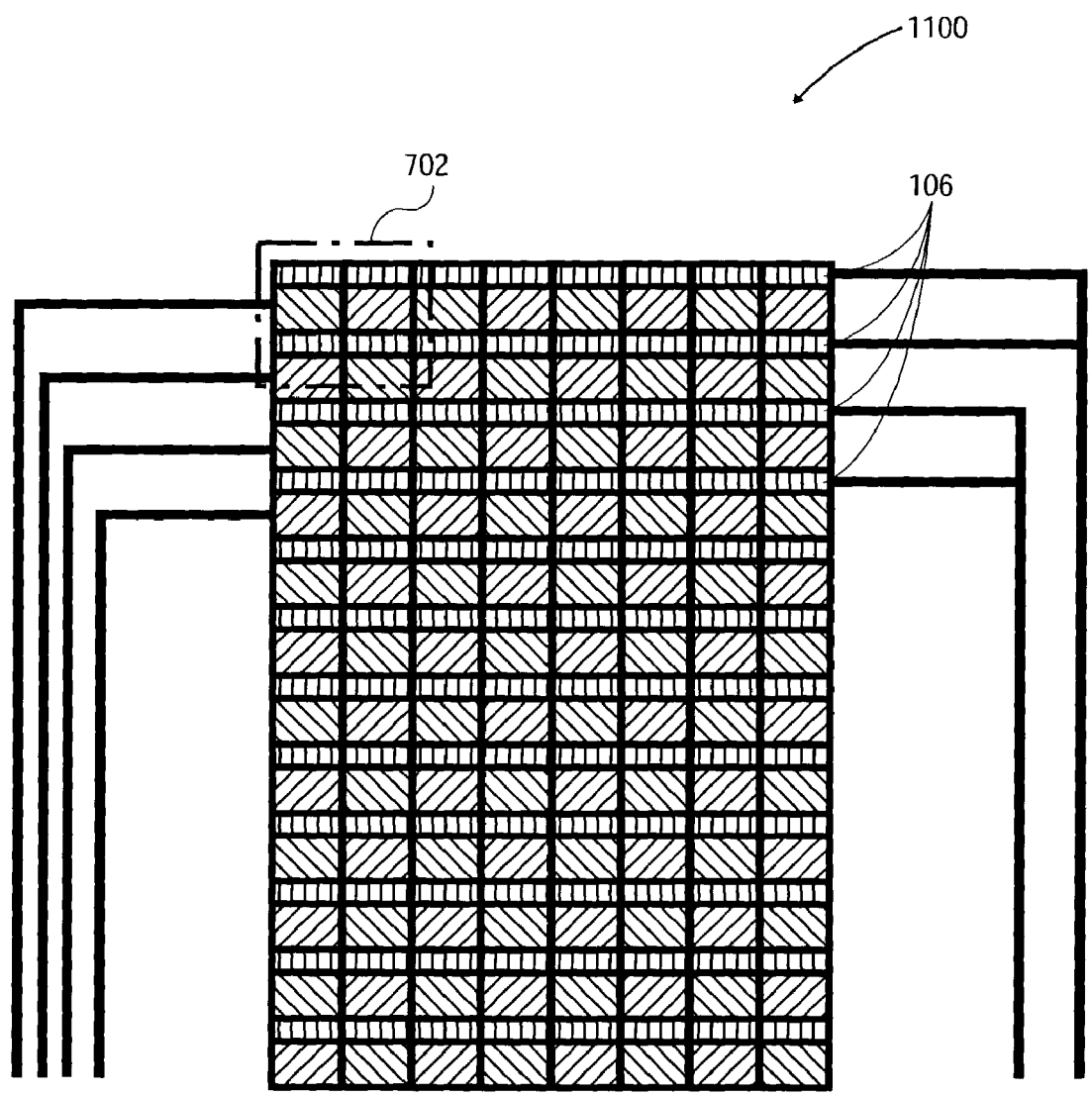
FIGS. 10 and 11 depict two different embodiments of TFT connections to driver without use of crossovers for the novel eight sub-pixel repeat cell arrangement.
Figure 11:
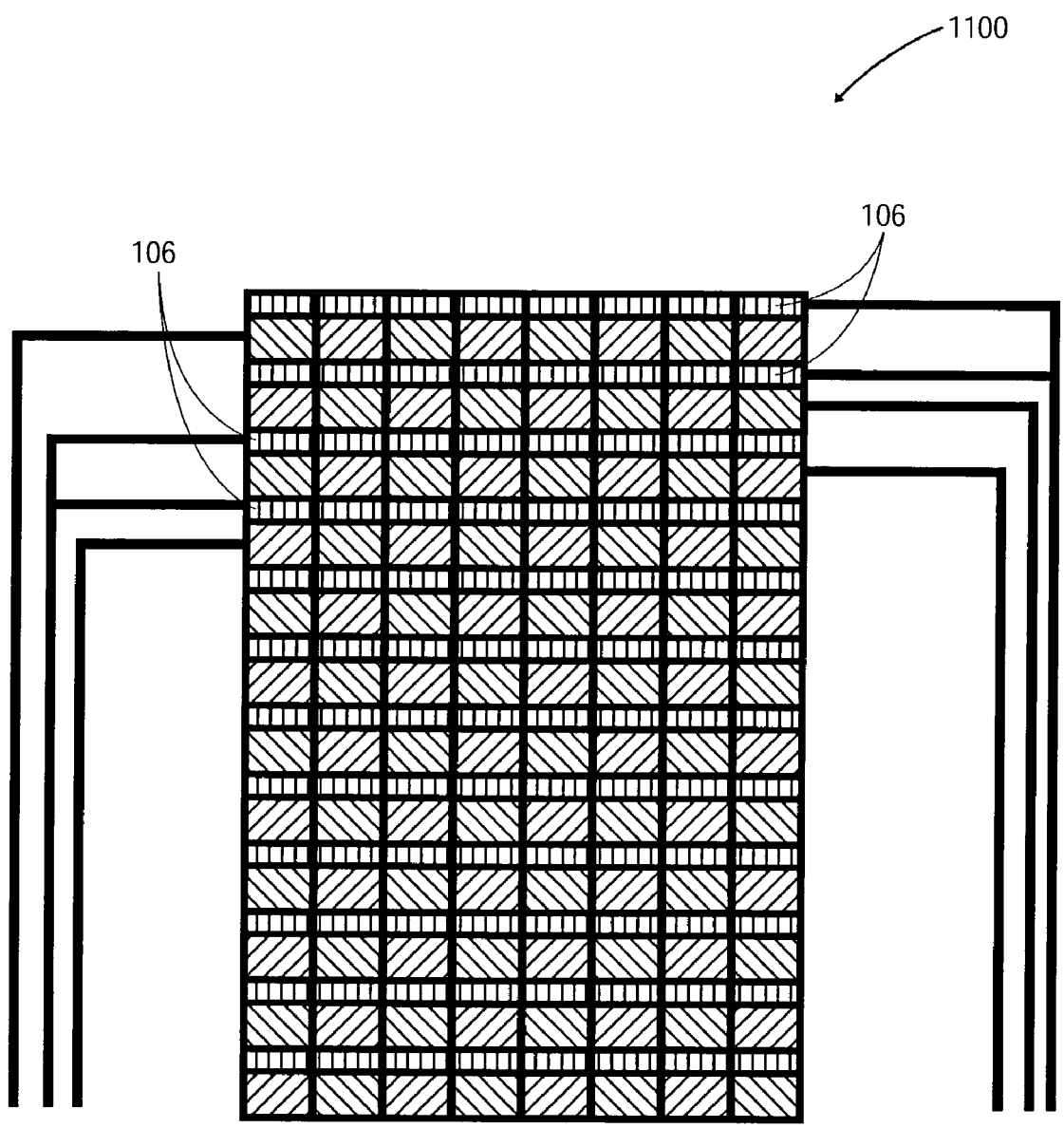

To achieve a similar result without crossovers, FIGS. 10 and 11 depict two layouts—1000 and 1100 respectively—for an arrangement similarly comprising the octal repeat cell of 702. The connections are made on alternate sides in such a manner as to eliminate the need for a crossover connection. In FIG. 10, the number of leads on the right and left sides are in the ratio of 2:1. The advantage of this type of connection is that the organization of data in column drivers is less complex. The connection pattern shown in FIG. 10 may be repeated to the bottom of the LCD.

In FIG. 11, the number of leads on each side is balanced. The order of data may be more complicated though. Left side data can proceed as follows: G1/R1, B3/4, R4/G4, etc., and the right side data can proceed as follows: B1/2, R2/G2, G3/R3, etc. This pattern may be repeated to the bottom of the display.

Thus, in displays where there are electrode connections on both sides of the display, the number of connections to the column driver is reduced and the number of column drivers required is the same as for a display based on the repeat cell shown in FIG. 1. For mobile phone STN displays, which do not have any crossover metal capability, this can lead to cost reduction for displays incorporating octal repeat group 702.

System Architecture

Figure 12A:
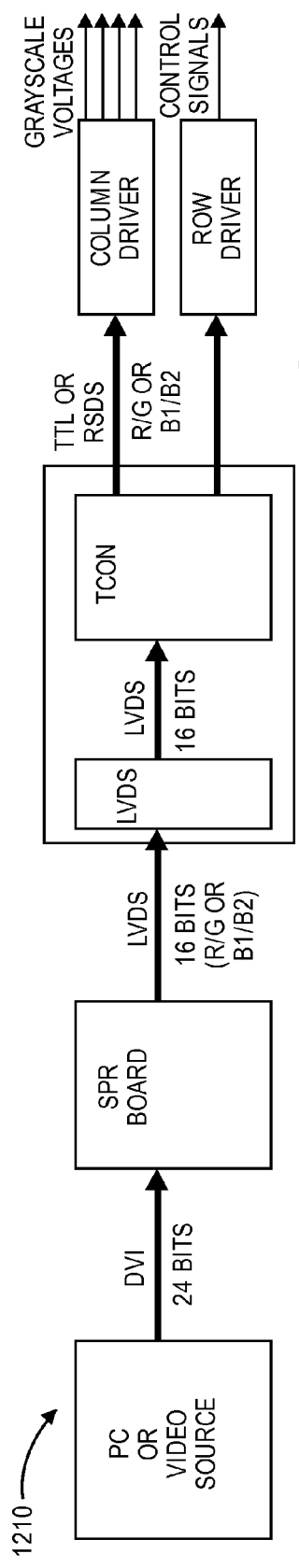
FIGS. 12A, 12B, and 12C depict various embodiments of a system architecture for panels comprising arrangements of sub-pixels laid out in a horizontal fashion.
Figure 12B:
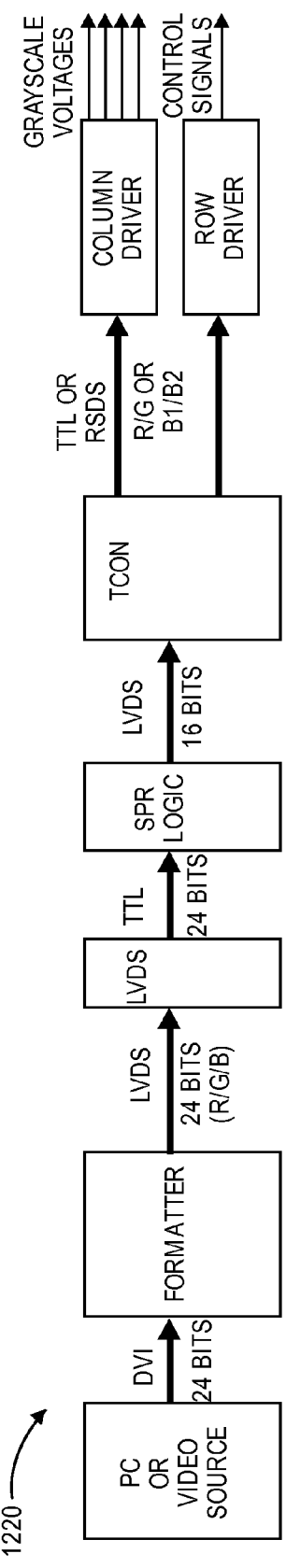
Figure 12C:
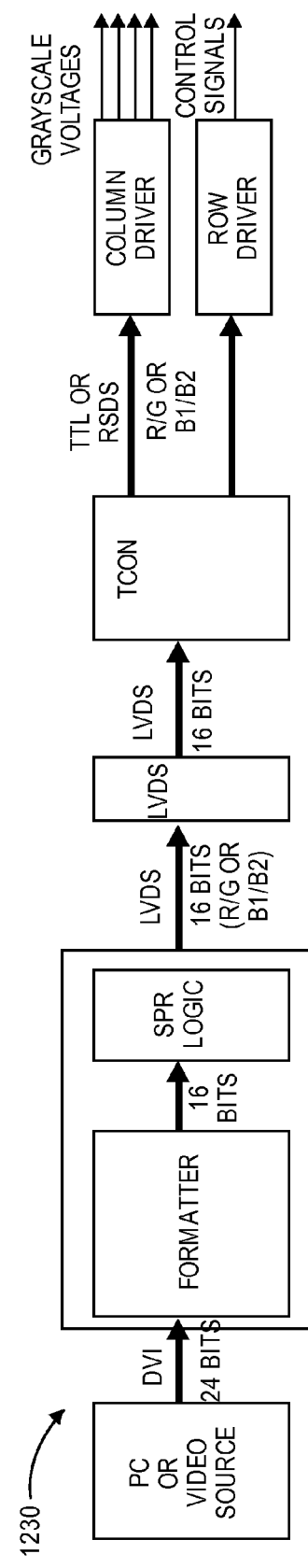

FIGS. 12A, 12B and 12C depict various system architectures 1210, 1220, and 1230, respectively, that may vary depending upon the driving scheme. As may be seen, these various embodiments differ in the location of the sub-pixel rendering (SPR) logic location within the system. The system architectures 1210, 1220, and 1230 of FIGS. 12A, 12B, and 12C, respectively, may apply to the various layouts shown in FIGS. 6-8. The components described in FIGS. 12A, 12B, and 12C can operate in a manner described in U.S. Patent Publication No. 2003/0103058 ("the '058 application") entitled "METHODS AND SYSTEMS FOR SUB-PIXEL RENDERING WITH GAMMA ADJUSTMENT," filed on May 17, 2002, which is hereby incorporated herein by reference and commonly owned by the same assignee of this application, to perform sub-pixel rendering techniques with the sub-pixel arrangements disclosed herein. Specifically, as described in the '058 application, sub-pixel rendering may proceed as a method of "area resampling" input image data onto target subpixels (or "emitters"). As described in the '058 application at paragraphs 0083-0085, to determine the values for each emitter, first one must create transform equations that take the form of filter kernels. The filter kernels are generated by determining the relative area overlaps of both the original data set sample areas and target display sample areas. The ratio of overlap determines the coefficient values to be used in the filter kernel array. To render the stored image onto the display device, the reconstruction points are determined in each three-color pixel element. The center of each reconstruction point will also be the source of sample points used to reconstruct the stored image. Similarly, the sample points of the image data set is determined. Each reconstruction point is located at the center of the emitters (e.g., in the center of a red emitter). In placing the reconstruction points in the center of the emitter, a grid of boundary lines is formed equidistant from the centers of the reconstruction points, creating sample areas (in which the sample points are at the center). The grid that is formed creates a tiling pattern. The shapes that can be utilized in the tiling pattern can include, but is not limited to, squares, staggered rectangles, triangles, hexagons, octagons, diamonds, staggered squares, staggered rectangles, staggered triangles, staggered diamonds, Penrose tiles, rhombuses, distorted rhombuses, and the line, and combinations comprising at lease one of the foregoing shapes. The sample points and sample areas for both the image data and the target display having been determined, the two are overlaid. The overlay creates sub-areas wherein the output sample areas overlap several input sample areas. The area ratios of input to output is determined by either inspection or calculation and stored as coefficients in filter kernels, the value of which is used to weight the input value to output value to determine the proper value for each emitter.

While the invention has been described with reference to exemplary embodiments, various modifications or changes may be made and equivalents may be substituted for elements thereof without departing from the scope of the invention. In addition, many modifications may be made to adapt a particular situation or material to the teachings without departing from the essential scope thereof. For example, some of the embodiments above may be implemented in other display technologies such as Organic Light Emitting Diode (OLED), ElectroLumenscent (EL), Electrophoretic, Active Matrix Liquid Crystal Display (AMLCD), Passive Matrix Liquid Crystal display (AMLCD), Incandescent, solid state Light Emitting Diode (LED), Plasma Display Panel (PDP), and Iridescent. Therefore, it is intended that the invention not be limited to the particular embodiments disclosed herein as the best mode contemplated for carrying out this invention, but that the invention will include all embodiments falling within the scope of the appended claims.

What is claimed is:

1. A display system comprising:
a display panel substantially comprising a plurality of sub-pixel groups; each sub-pixel group of the plurality of sub-pixel groups comprising six sub-pixels in first, second and third primary colors disposed in three rows and two columns; each sub-pixel having a width along a horizontal axis greater than a height along a vertical axis; one of said three rows of said sub-pixel group forming a horizontal stripe of first and second same-colored sub-pixels in said first primary color; each of second and third rows of said sub-pixel group comprising one of each of said second and third primary color sub-pixels;
a first row driver coupled to said first same-colored sub-pixel in said horizontal stripe of first and second same-colored sub-pixels of the sub-pixel group; and
a second row driver coupled to said second same-colored sub-pixel in said horizontal stripe of first and second same-colored sub-pixels of the sub-pixel group.

2. The display system as recited in claim 1 wherein said horizontal stripe of first and second same-colored sub-pixels comprises blue sub-pixels aligned substantially along a horizontal axis on said display panel.

3. The display system of claim 1 further comprising:
a pair of column drivers each coupled to said sub-pixels of said second and third primary colors disposed in one of said two columns of sub-pixels of said sub-pixel group; and
a third column driver coupled to said sub-pixels of said first primary color disposed in said two columns of sub-pixels of said sub-pixel group.

4. The display system of claim 3 wherein one of said pair of column drivers and said third column driver are both disposed between said two columns of sub-pixels of said sub-pixel group.

5. The display system of claim 3 wherein one of said pair of column drivers coupled to said sub-pixels in said second and third primary colors is disposed to the right of said two columns of sub-pixels of said sub-pixel group.

6. The display system of claim 1 wherein said second and third primary color sub-pixels disposed in each of said second and third rows of said sub-pixel group form a checkerboard pattern such that a third primary color sub-pixel follows a second primary color subpixel in said second row and a second primary color subpixel follows a third primary color subpixel in said third row of said sub-pixel group.

7. The display system of claim 1 wherein said first and second same-colored sub-pixels in said first primary color of said sub-pixel group forming said horizontal stripe are shorter in height along said vertical axis than said sub-pixels in said second and third primary colors.

8. The display system of claim 1 wherein said first and second same-colored sub-pixels in said first primary color of said sub-pixel group forming said horizontal stripe are one-half the height of said sub-pixels in said second and third primary colors along said vertical axis.

9. The display system as recited in claim 1 wherein said horizontal stripe of first and second same-colored sub-pixels in said sub-pixel group comprises green sub-pixels aligned substantially along a horizontal axis on said display panel.

10. The display system as recited in claim 1 wherein said first row driver is further coupled to said second and third primary color sub-pixels in said second row of said sub-pixel group; and wherein said second row driver is further coupled to said second and third primary color sub-pixels in said third row of said sub-pixel group.

11. A display system comprising:
a display panel substantially comprising a plurality of sub-pixel groupings; each sub-pixel grouping of the plurality of sub-pixel groupings comprising eight sub-pixels disposed in two columns and four rows such that two non-adjacent rows form first and second non-adjacent horizontal stripes of a first color and two other non-adjacent rows each comprises one sub-pixel of a second color and one sub-pixel of a third color;
a first row driver coupled to at least one sub-pixel in said first horizontal stripe of sub-pixels and to said sub-pixels in a first one of said non-adjacent rows of second and third color sub-pixels in said sub-pixel grouping; and
a second row driver coupled to at least one sub-pixel in said second horizontal stripe of sub-pixels and to said sub-pixels in a second one of said non-adjacent rows of second and third color sub-pixels in said sub-pixel group.

12. The display as recited in claim 11 wherein said first color comprises a green color and each said second color and said third color comprise one of a group, said group comprising red and blue colors, respectively.

13. The display as recited in claim 11 wherein said first color comprises a red color and each said second color and said third color comprise one of a group, said group comprising green and blue colors, respectively.

14. The display as recited in claim 11 wherein said first set of two non-adjacent columns further comprise four sub-pixels of a first color wherein said four sub-pixels of a first color comprising a smaller area than said sub-pixels of second color and said sub-pixels of said third color.

15. The display as recited in claim 11 wherein said display comprises an AMLCD display and said display applies a dot inversion scheme for driving the sub-pixels.

16. The display as recited in claim 15 wherein said dot inversion scheme is 1×1 dot inversion.

17. The display as recited in claim 15 wherein said dot inversion scheme is 2×1 dot inversion.

18. The display system of claim 11 further comprising:
first and second column drivers each coupled to said sub-pixels of said second and third colors disposed in respective first and second columns of sub-pixels of said sub-pixel grouping; and a third column driver disposed between said first and second columns of said sub-pixel grouping and coupled to said sub-pixels of said first color disposed in only one column of said sub-pixel grouping.

19. The display system of claim 18 wherein said third column is coupled to said sub-pixels of said first color disposed in said second column of said sub-pixel grouping and sends image data signals to said first color sub-pixels disposed in the second column of said sub-pixel grouping and to first color sub-pixels disposed in the first column of an adjacent sub-pixel grouping via a single thin film transistor (TFT).

20. The display system of claim 11 further comprising:
first and second column drivers each coupled to said sub-pixels of said second and third colors disposed in respective first and second columns of sub-pixels of said sub-pixel grouping; and
a third column driver disposed between said second column of a first sub-pixel grouping and a first column of an adjacent second sub-pixel grouping; said third column driver being coupled to said sub-pixels of said first color disposed in both said second column of said first sub-pixel grouping and said first column of said adjacent second sub-pixel grouping.

21. A display system comprising:
a display panel substantially comprising a plurality of sub-pixel groupings forming a matrix of sub-pixel groupings on said display panel; each sub-pixel grouping of the plurality of sub-pixel groupings comprising eight sub-pixels disposed in two columns and four rows such that two non-adjacent rows form first and second non-adjacent horizontal stripes of a first color and two other non-adjacent rows each comprises one sub-pixel of a second color and one sub-pixel of a third color; and
a plurality of row drivers coupled to rows of sub-pixels in said sub-pixel grouping; a first subset of said row drivers sending signals from a first side of said display panel, and a second subset of said row drivers sending signals from a second side of said display panel opposite to said first side.

22. The display system of claim 21 wherein said first subset of row drivers comprises first and second row drivers coupled to said sub-pixels in respective ones of said non-adjacent rows of second and third color sub-pixels in said sub-pixel grouping; and
said second subset of row drivers comprises a third row driver coupled to said sub-pixels in both of said non-adjacent rows forming first and second horizontal non-adjacent stripes of said first color in said sub-pixel grouping.

23. The display system of claim 21 wherein a number of row drivers in said first subset of row drivers is equal to a number of row drivers in said second subset of row drivers for every two vertically adjacent sub-pixel groupings.

* * * * *